United States Patent

Kawazoe et al.

Patent Number: 5,381,287
Date of Patent: Jan. 10, 1995

[54] HARD DISC DRIVE

[75] Inventors: Kazushige Kawazoe; Osamu Morita, both of Kanagawa, Japan

[73] Assignee: Sony Corporation, Tokyo, Japan

[21] Appl. No.: 240,495

[22] Filed: May 10, 1994

Related U.S. Application Data

[63] Continuation of Ser. No. 946,612, Sep. 18, 1992, abandoned.

[30] Foreign Application Priority Data

Sep. 20, 1991 [JP] Japan .................................. 3-242091

[51] Int. Cl.$^6$ .............................................. G11B 5/60
[52] U.S. Cl. .............................................. 360/103
[58] Field of Search ......................................... 360/103

[56] References Cited

U.S. PATENT DOCUMENTS

4,420,780 12/1983 Deckert ............................. 360/122

FOREIGN PATENT DOCUMENTS

0120990 10/1984 European Pat. Off. .
0339813 2/1989 European Pat. Off. .
0339851 2/1989 European Pat. Off. .

OTHER PUBLICATIONS

*Patent Abstracts of Japan,* vol. 9, No. 227, Publication No. JP60085476, 14 May 1985.

*Primary Examiner*—A. J. Heinz
*Attorney, Agent, or Firm*—Hill, Steadman & Simpson

[57] ABSTRACT

The present invention is directed to a hard disc drive, in which a floating amount of a floating slider above a discrete type recording medium can be suppressed from being fluctuated to thereby stabilize a reproduced output voltage. The ratio between a maximum wavelength ($L_{max}$) of an information pattern (2) of a discrete type recording medium (1) and the length $L_{SL}$ of a floating slider (3) in the running direction relative to the recording medium (1) is selected so as to satisfy $L_{SL}/L_{max} > 1$.

2 Claims, 3 Drawing Sheets

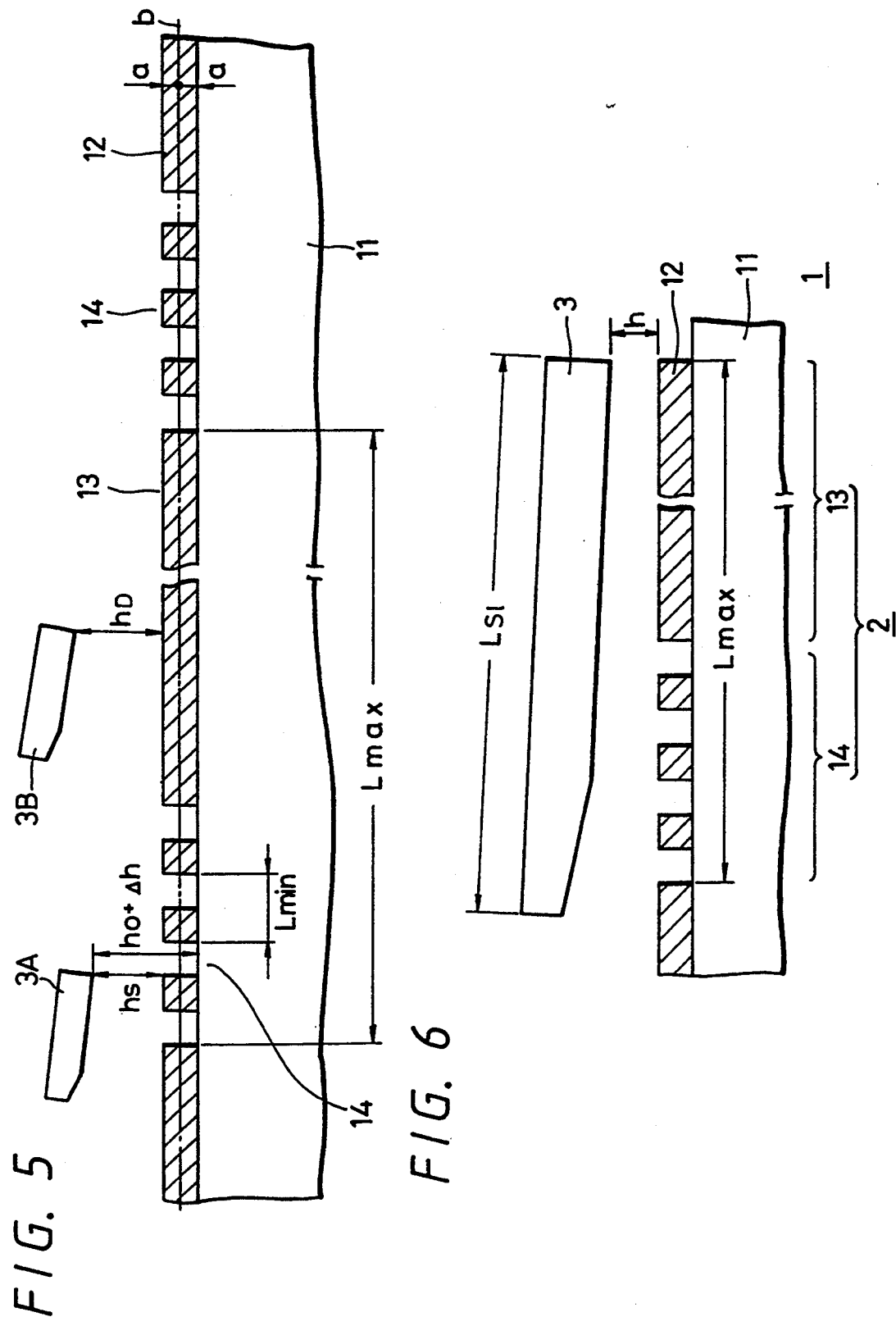

HARD DISC DRIVE

This is a continuation of application Ser. No. 07/946,612 filed Sep. 18, 1992, abandoned.

BACKGROUND OF THE INVENTION

1. Field of the Invention

The present invention relates to a hard disc drive and, more particularly, to a hard disc drive utilizing a discrete type recording medium.

2. Description of the Prior Art

Research and development of a hard disc drive utilizing a discrete type recording medium, i.e., so-called discrete track media have been made recently. FIG. 1 of the accompanying drawings schematically shows a fragmentary enlarged plan view of one track of the discrete type recording medium. As shown in FIG. 1, a head positioning servo signal for the discrete type recording medium is shown, in which servo patterns 14 each made of a checkered pattern are recorded in advance on a recording medium 11 together with data recorded patterns 13, similarly to an optical recording medium, i.e., a so-called optical disc.

FIG. 2 shows a fragmentary enlarged cross-sectional view of a structure of the discrete type recording medium or disc. As shown in FIG. 2, concave and convex portions are formed on a disc substrate 11 due to the presence or absence of magnetic layer 12. More specifically, data recording patterns 13 each having concave and convex portions of relatively long cycle, to form a continuous data recording area i.e. long wavelength, and servo patterns 14 each having concave and convex portions of relatively short cycle, i.e., short wavelength, are formed on the disc substrate 11 in a mixed state.

The wavelength in this specification depicts a duration of cycle during which concave and convex portions, i.e., information patterns, are formed due to the presence or absence of the magnetic layer 12 on the discrete type recording medium 1, for example.

Considering the concave and convex portions formed by the presence or absence of the magnetic layer 12 as an undulation of a certain wave, as shown in FIG. 3, a floating amount of a floating slider 3 which is floated from the magnetic layer 12 could be considered as a fluctuation of the floating amount if the disc substrate 11 has an undulation. In FIG. 3, reference letter a represents the amplitude of the undulation, L the wavelength, $H_0$ the minimum floating amount and $\Delta h$ the fluctuated amount of the floating amount.

Assuming that a slider length $L_{SL}$ of the floating slider 3 is taken constant, then the fluctuated amount $\Delta h$ of the floating amount is approximately expressed as shown in FIG. 4 of the accompanying drawings. Analysis of FIG. 4 reveals that the fluctuated amount $\Delta h$ of the floating amount is changed by the undulation wavelength L (see Collection of Papers published by The Japan Society of Mechanical Engineers (edition C), Vol. 51, No. 469 (September 1985), pp. 2291 to 2299).

A study of FIG. 4 reveals that, when the undulation wavelength, namely, the wavelength L of the data recording pattern 13 and the servo pattern 14 is changed, the floating amount fluctuated amount $\Delta h$ is changed, accordingly, the floating amount ($H_0 + \Delta h$) of the floating slider 3 also is changed similarly. That is, above the same recording medium 1, the floating amount of the floating slider 3 is changed as $h_0 + \Delta h_1$, $h_0 + \Delta h_2$, ..., for example, depending on the difference of length of the information pattern. Consequently, the distance (hereinafter referred to as "spacing amount") between a recording and/or reproducing head on the floating slider 3 and the magnetic layer 12 is fluctuated.

There is then the disadvantage such that a reproduced output voltage is lowered at the portion where the spacing amount is increased.

In order to avoid the fluctuation of the floating amount, as is clear from FIG. 4, it is proposed to reduce the floating amount fluctuated amount $\Delta h$ by reducing the length $L_{SL}$ of the floating slider 3 as compared with the wavelength L of the information pattern. However, the shortest wavelength of the wavelength L of this information pattern, i.e., the wavelength of the servo pattern 14 is as small as less than about 1 μm and a floating slider whose length is smaller than the above wavelength cannot be formed without difficulty.

Further, another technique is proposed, in which concave and convex portions comprising information patterns are filled and flattened after the magnetic layer 12 has been treated by the patterning process. In actual practice, a manufacturing process based on this technique is difficult and cumbersome, which unavoidably lowers the efficiency of mass production.

OBJECTS AND SUMMARY OF THE INVENTION

Therefore, it is an object of the present invention to provide an improved hard disc drive in which the aforesaid shortcomings and disadvantages encountered with the prior art can be eliminated.

More specifically, it is an object of the present invention to provide a hard disc drive in which a floating amount fluctuated amount can be prevented from being fluctuated due to the difference of the length of the information pattern on a discrete type recording medium.

Another object of the present invention is to provide a hard disc drive in which a spacing amount can be suppressed from being fluctuated to thereby stabilize a reproduced output voltage.

According to an aspect of the present invention, a hard disc drive utilizing a discrete type recording medium is characterized in that the ratio between a maximum wavelength $L_{max}$ of an information pattern of the discrete type recording medium and the length $L_{SL}$ of a floating slider in its transporting direction relative to the recording medium is given by:

$$L_{SL}/L_{max} > 1$$

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 5 is a fragmentary enlarged cross-sectional view used to explain a floating amount of a floating slider in a hard disc drive according to the prior art; and FIG. 6 is a fragmentary enlarged cross-sectional view of an embodiment of a structure of a hard disc drive according to the present invention.

DETAILED DESCRIPTION OF THE PREFERRED EMBODIMENT

Figure 1:
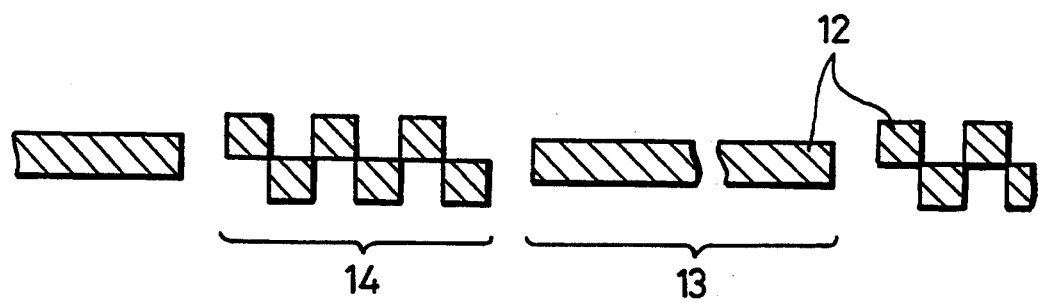
FIG. 1 is a fragmentary enlarged plan view of one track of a discrete type recording medium.
Figure 2:
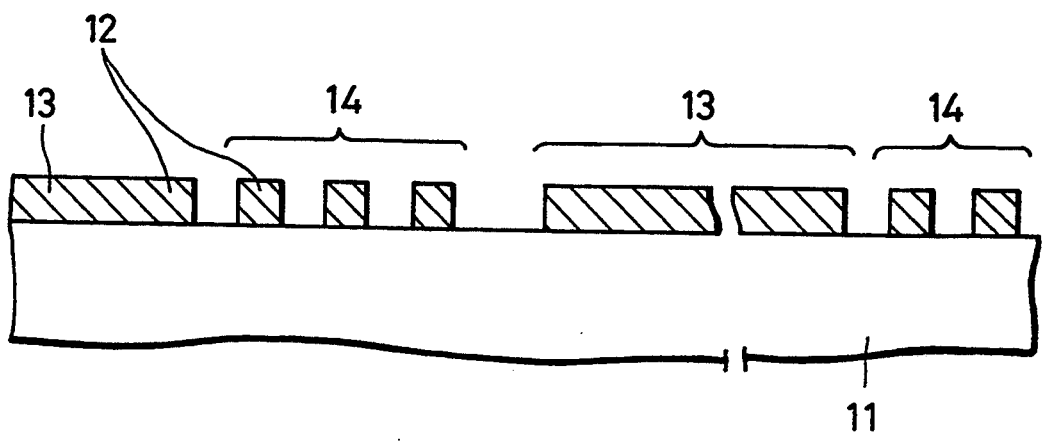
FIG. 2 is a fragmentary enlarged cross-sectional view of a structure of a discrete type recording medium.
Figure 3:
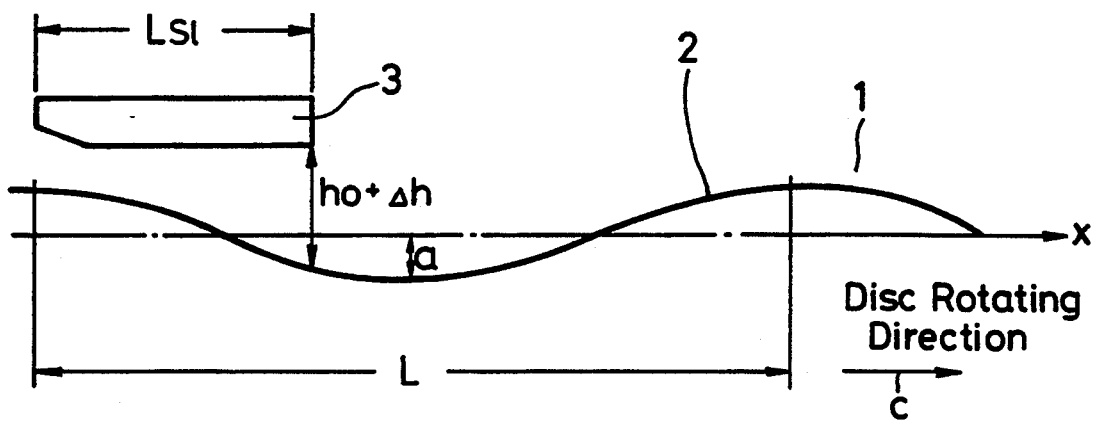
FIG. 3 is an explanatory diagram showing a floating amount of a hard disc drive according to the prior art.
Figure 4:
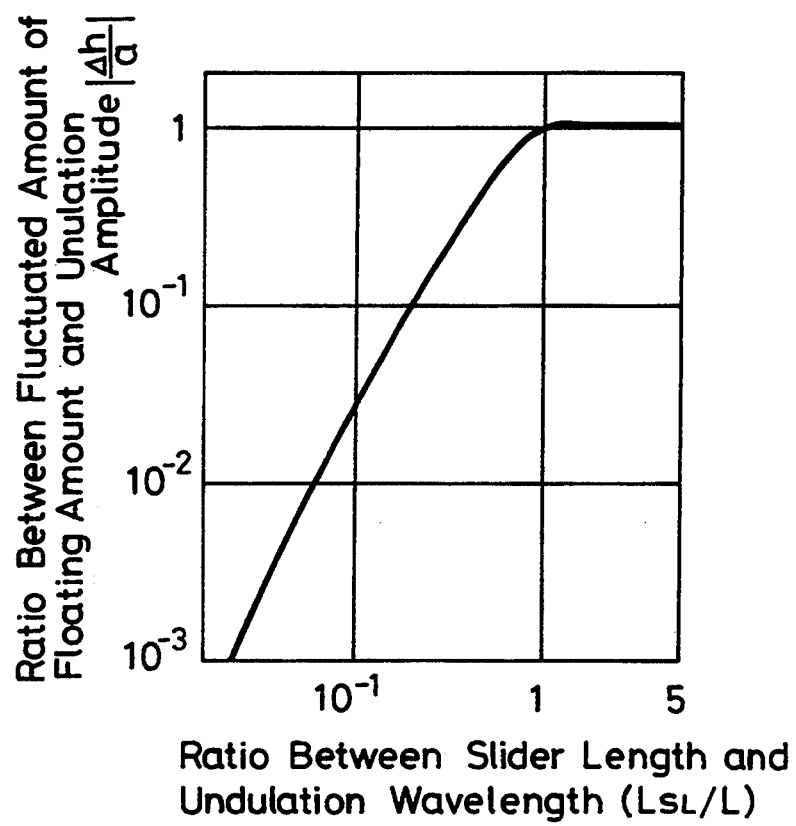
FIG. 4 is a graph showing a floating amount fluctuated amount of a floating slider.

Prior to describing a preferred embodiment of the present invention in detail, the fundamental principle of the present invention will be described initially.

In a hard disc drive according to the present invention, as shown in FIG. 6, by selecting the ratio $L_{SL}/L_{max}$ between a length $L_{SL}$ of a floating slider 3 and a maximum wavelength $L_{max}$ of an information pattern 2 on a recording medium 1 to be larger than 1, i.e., selecting the slider length $L_{SL}$ to be longer than the maximum wavelength $L_{max}$ of the information pattern 2, the floating amount fluctuated amount $\Delta h$ can be kept constant and the distance between the slider 3 and the information pattern 2 on the recording medium 1, i.e., the spacing amount can be kept constant, thereby avoiding the reproduced voltage from being lowered, which will be described below.

FIG. 5 of the accompanying drawings shows a floating amount of a floating slider in an example of a conventional hard disc drive, and to which references will be made in comparing the prior art and the present invention.

As shown in FIG. 5, a floating slider 3A is located above a servo pattern 14 of a minimum wavelength $L_{min}$ and $h_s$ depicts a resultant floating amount of the floating slider 3A from the upper surface of the magnetic layer 12. Further, a floating slider 3B is located above a data recording pattern 13 of a relatively long wavelength and $h_D$ depicts a resultant floating amount of the floating slider 3B from the upper surface of the magnetic layer 12 similarly.

Assuming that the floating amount is $H_0 + \Delta h$ as described before, then above the servo pattern 14, the floating slider 3A is floated following the undulation of the servo pattern 14. Thus, the floating amount fluctuated amount $\Delta h$ is given by $\Delta h$ a and expressed as $h_s = H_0 - a$ where a is the amplitude of the undulation. The amplitude a corresponds to half of the thickness of the magnetic layer 12. In FIG. 5, a one-dot chain line b indicates the central line of the undulation.

However, above the data recording pattern 13, since the length of the floating slider 3B is small as compared with the wavelength of the undulation, the floating slider 3B can be prevented from being floated following the undulation and the floating amount fluctuated amount $\Delta h$ becomes substantially zero. Accordingly, the floating amount becomes $H_0$ constantly and is expressed as $h_D = h_0$.

That is, the floating amount $h_s$ above the servo pattern 14 of short wavelength is reduced as compared with the floating amount $h_D$ above the data recording pattern 13 of long wavelength with the result that the floating amount above the long-wavelength pattern is increased as compared with that of the short-wavelength pattern.

Having considered the fact that the ratio between the floating amount fluctuated amount and the amplitude of the undulation is made 1 and constant by selecting the length $L_{SL}$ of the slider 3 to be longer than the wavelength L of the information pattern, the inventors of the present invention have solved the above-mentioned problem. More specifically, by selecting the length $L_{SL}$ of the slider 3 to be longer than the wavelength $L_{max}$ of the maximum information pattern, i.e., the sum of the length of the servo pattern 14 and the length of the recording pattern 13 in the relative running direction to the slider 3 or by selecting the wavelength $L_{max}$ of the maximum information pattern on the recording medium 1 to be smaller than the length $L_{SL}$ of the slider 3, the floating slider 3 can be prevented from being floated following the undulation on the recording medium 1, i.e., the floating amount fluctuated amount $\Delta h$ can be made substantially the same as that amplitude a of the undulation, thereby making the spacing amount constant.

In other words, according to the present invention, by selecting the length $L_{SL}$ of the floating slider 3 to be longer than that of the prior art or by selecting the wavelength of the information pattern on the recording medium 1 to be smaller than that of the prior art, the spacing amount between the slider 3 and the magnetic layer 12 can be held substantially constant although the floating amount fluctuated amount $\Delta h$ above the long pattern, i.e., the data recording pattern 13 is slightly increased as compared with the prior art. Thus, the reproduced output voltage can be stabilized.

An embodiment of the hard disc drive according to the present invention will now be described in detail with reference to FIG. 6. In FIG. 6, like parts corresponding to those of FIG. 1 on are marked with the same references and therefore need not be described in detail.

As shown in FIG. 6, there is provided a discrete type recording medium, e.g., a magnetic disc 1 in which the magnetic layer 12 is deposited on the disc substrate 11 and then treated by the patterning-process, thereby forming the data recording patterns 13 and the servo patterns 14 as described in connection with FIG. 1.

Assuming that $L_{max}$ represents the sum of lengths of the respective patterns 13 and 14 in the relative running direction to the floating slider 3, then the length $L_{max}$ is selected to be small as compared with the length $L_{SL}$ of the floating slider 3 in the relative running direction to the recording medium 1, i.e., $L_{SL}/L_{max} > 1$ is satisfied.

In this case, the present invention is applied to a 3.5-inch hard disc drive, and in a 3.5-inch discrete-type recording medium 1, the maximum wavelength $L_{max}$ of the information pattern is selected to be small as compared with that of the prior art.

More specifically, the number of sectors is about 49 in the prior art but in this embodiment, 100 sectors are available. At that time, the radius of the outermost periphery of the recording portion of the recording medium 1 is 44 mm, and a spacing between the adjacent sectors, i.e., the maximum wavelength $L_{max}$ of the information pattern 2 corresponding to the sum of the data recording pattern 13 and the servo pattern 14 in FIG. 6 becomes about 2.76 mm.

When the above recording medium 1 is recorded and/or reproduced by the floating slider 3 whose length $L_{SL}$ in the running direction relative to the recording medium 1 is selected to be 4 mm, the floating amount fluctuated amount $\Delta h$ could be made substantially constant. Therefore, a substantially constant reproduced output voltage could be obtained regardless of the floating slider 3 above the recording medium 1.

In this case, a structure, which is difficult to make, such as a structure in which concave and convex portions of the information pattern by the magnetic layer 12 on the recording medium 1 are filled and then flattened, is not needed and the hard disc drive according to the present invention can be produced by a manufacturing method similar to that of the prior art.

As described above, according to the present invention, the floating amount fluctuated amount of the floating slider 3 can be made constant regardless of the position of the floating slider 3 above the discrete type recording medium 1.

Therefore, a constant reproduced output voltage can be obtained in any position of the discrete type recording medium 1. Hence, a reproducing characteristic can be improved.

Furthermore, the surface of the recording medium 1 need not be flattened and the hard disc drive apparatus can be produced by the manufacturing method similar to that of the prior art.

Having described a preferred embodiment of the invention with reference to the accompanying drawings, it is to be understood that the invention is not limited to that precise embodiment and that various changes and modifications thereof could be effected therein by one skilled in the art without departing from the spirit or scope of the novel concepts of the invention as defined in the appended claims.

What is claimed is:

1. A hard disc drive utilizing a discrete type recording medium having an information pattern with concave and convex portions formed therein characterized in that the ratio between a maximum wavelength $L_{max}$ of said information pattern of said discrete type recording medium and a length $L_{SL}$ of a floating slider in the running direction relative to said recording medium is given by:

$$L_{SL}/L_{max} > 1.$$

2. The hard disc drive according to claim 1, wherein said wavelength of said information pattern is the sum of a data recording pattern length and a servo pattern length of one sector.

* * * * *